United States Patent [19]

Matsushima et al.

[11] 4,357,666
[45] Nov. 2, 1982

[54] DIGITAL DISTANCE RELAYS

[75] Inventors: Tetsuo Matsushima, Fuchu; Ryotaro Kondow, Tokyo; Kunio Matsuzawa, Sagamihara, all of Japan

[73] Assignee: Tokyo Shibaura Denki Kabushiki Kaisha, Kawasaki, Japan

[21] Appl. No.: 130,526

[22] Filed: Mar. 14, 1980

[30] Foreign Application Priority Data

Mar. 19, 1979 [JP] Japan .................................. 54-31016

[51] Int. Cl.³ ........................ H02H 3/42; G06F 15/20
[52] U.S. Cl. ....................................... 364/492; 361/80
[58] Field of Search .................. 364/551, 492; 361/79, 361/80, 86, 87; 340/662, 663, 664

[56] References Cited

U.S. PATENT DOCUMENTS

| | | | |
|---|---|---|---|
| 3,379,934 | 4/1968 | Hoel et al. | 361/80 |
| 3,474,333 | 10/1969 | Hoel | 361/80 |
| 3,984,737 | 10/1976 | Okamura et al. | 361/80 |
| 4,107,778 | 8/1978 | Nii et al. | 364/492 |
| 4,212,046 | 7/1980 | Andow et al. | 361/80 |
| 4,228,476 | 10/1980 | Okita et al. | 364/492 X |

FOREIGN PATENT DOCUMENTS

| | | | |
|---|---|---|---|
| 52-54467 | 5/1977 | Japan | 361/79 |
| 7944043 | 7/1980 | United Kingdom | 361/80 |

OTHER PUBLICATIONS

Elmlund: Distance Protection for Three—Phase Power Lines, ASEA Journal, vol. 35, No. 1-2, 1962, pp. 14–19.
Tegawa et al.: New Totally—Digitized Control System, Conference proceedings.
Conference on Automatic Control and Protection of Electric Power Systems, IFAC Symposium, 1977, pp. 33-35.

*Primary Examiner*—Felix D. Gruber
*Attorney, Agent, or Firm*—Kenyon & Kenyon

[57] ABSTRACT

In a digital distance relay including sample-hold circuits for sampling the voltage and current of an electric power line system, analog-digital converters for converting the outputs of the sample-hold circuits into digital values, memory devices for memorizing the digital values and a program, and a central processing unit for exercising a relaying operation, there is provided a central processing unit which includes means for determining whether at least one of the digital values is greater than a predetermined value. The relaying operation of the distance relay is initiated only when the one digital value is greater than the predetermined value. A method is disclosed which includes the above determining step.

6 Claims, 11 Drawing Figures

F I G. 1
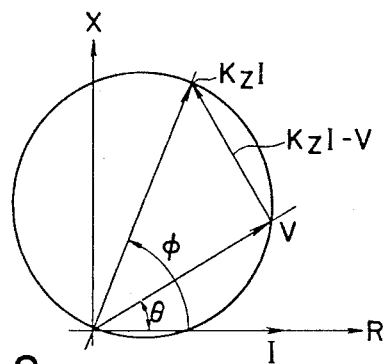
F I G. 2
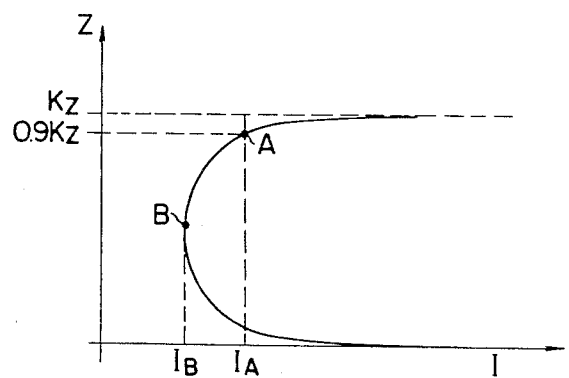
F I G. 4
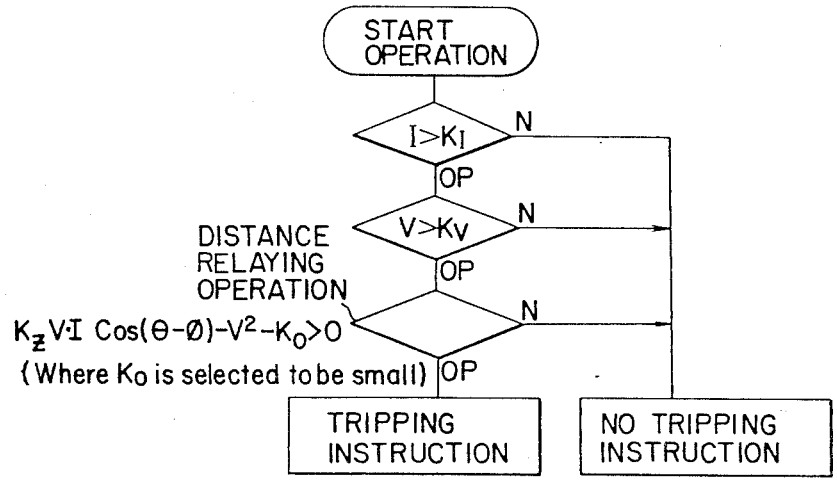

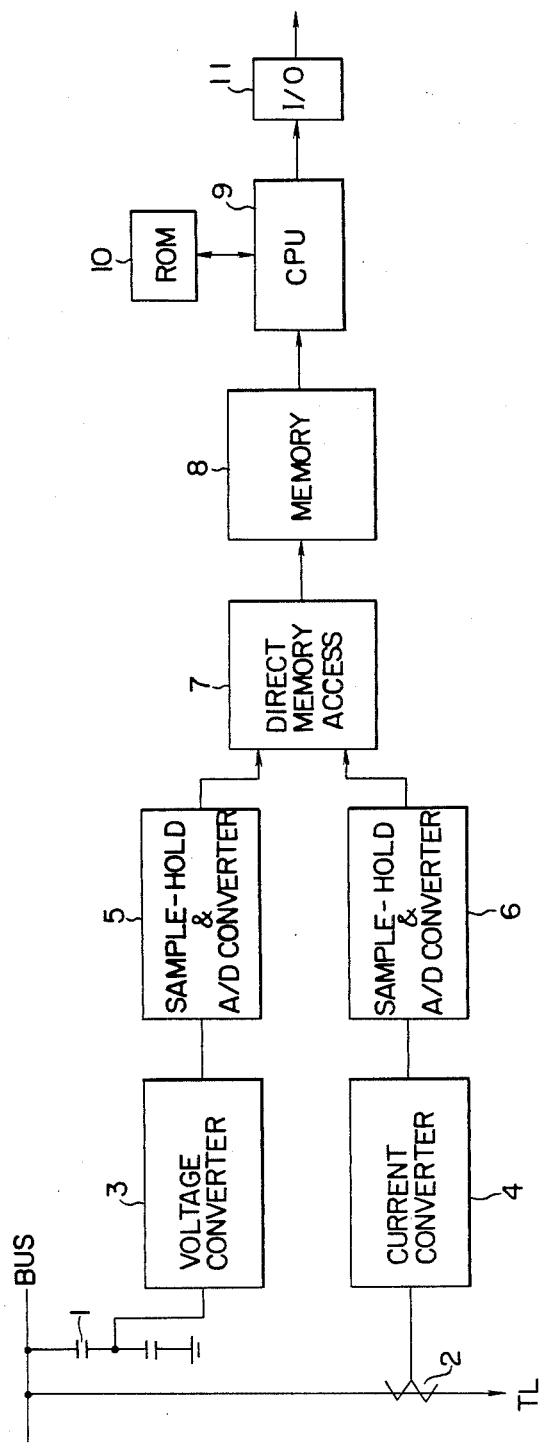

DIGITAL DISTANCE RELAYS

BACKGROUND OF THE INVENTION

This invention relates to improvements protective relays to be used for protecting electric power transmission lines and the like, and more particularly to improvement in a digital distance relay wherein the sensitivity for detecting faults is substantially improved.

The capability of detecting faults with high sensitivity in an electric system to be protected is essential to a protective relay. More specifically, when a long-distance electric power transmission line is protected by a distance relay, it is essential to accurately determine the distance between the position of the relay and a faulty point even when the fault current is small. The capability of determining the distance is hereinafter termed "distance detecting property". The sensitivity and the distance detecting property of ordinary protective relays will now be described with regard to a mho relay, for instance.

The mho characteristics shown in FIG. 1 can be realized in various ways utilizing, for instance, a protective relay of an electromagnetic induction type, the basic operation of which can be defined by the following well-known relation.

$$K_Z V \cdot I \cos(\theta - \phi) - V^2 - K_o > 0 \qquad (1)$$

wherein: $K_Z$ is a predetermined constant, $\theta$ is a phase angle between an input voltage V and an input current I both detected by the relay, $K_o$ is a constant as described hereinafter, and $\phi$ is an electric angle at which a maximum sensitivity of the relay can be obtained.

Depending on the constant $K_o$, the sensitivity of the protective relay can be adjusted suitably. However, the effect of the constant $K_o$ for adjusting the sensitivity is substantially reduced when the input voltage V or the input current I is comparatively high.

The distance detecting property of the protective relay, while operating at a maximum-sensitivity angle $\theta$ (that is $\theta = \phi$ and $\cos(\theta - \phi) = 1$), can be expressed as follows in terms of the input current I of the expression (1).

$$I^2 > K_o/Z(K_Z - Z) \qquad (2)$$

where $Z = V/I$.

FIG. 2 represents this relation (2). In FIG. 2, a reference character A designates a point at which the distance detecting property of the relay is 90% of the maximum protectable range of the mho relay, and a reference character B designates a point defining a minimum operable input current. It is apparent from the relation (2) that the currents $I_A$ and $I_B$ corresponding respectively to those at points A and B in FIG. 2 are increased in accordance with the constant $K_o$, and that the sensitivity of the protective relay is thereby reduced. In other words, it is apparent that a smaller value of the constant $K_o$ is preferably because the sensitivity and the distance detecting property of the protective relay are thereby improved.

However, a simple reduction of the constant $K_o$ causes disadvantages in the operation of the protective relay in which the relay tends to pick-up noise contained in the input AC voltage and current, particularly when the voltage and current are in their reduced ranges, or in which the relay is disturbed by offset and drift in the input or by a quantizing error when the relay is of a digital type.

In order to eliminate these disadvantages, a comparatively large value must be selected for the constant $K_o$, which inevitably increases the current value corresponding to the point A, and lowers the distance detecting property of the protective relay in a lower current range.

SUMMARY OF THE INVENTION

A primary object of the present invention is to provide improvement a digital distance relay and a method for protecting an electric power transmission system according to which sensitivity can be substantially improved in a lower input current range.

Another object of the invention is to provide improvements in a digital distance relay and a method for protecting an electric power transmission system in which a required distance detecting property can be obtained even according to which a low input current range, without entailing erroneous operation.

Still another object of the invention is to provide improvements in a digital distance relay and a method for protecting an electric power transmission system according to which the same system can be protected from a proximate failure without requiring any additional device.

These and other objects of the invention can be achieved in a digital distance relay for protecting an electric power transmission system, of a type comprising sample-hold circuits for sampling and holding input voltage and current picked-up from the power transmission system, analog-digital converters for converting the outputs of the sample-hold circuits into digital values, a first memory device for memorizing these digital values, a second memory device for memorizing programs to be used in a relaying operation, and a central processing device to execute the relaying operation based on the digital values memorized in the first memory device, under the control of the programs stored in the second memory device; wherein the central processing unit in cooperation with said memory devices determines whether one of the digital values corresponding to the input current is greater than a predetermined value or not, and initiates the relaying operation when the result in the preceding determination is affirmative.

The distance relay of the above described type may otherwise be modified in such a manner that the central processing unit in cooperation with said memory devices determines whether one of the digital values corresponding to the input voltage is greater than a predetermined value or not.

Alternatively, the central processing unit may in cooperation with said memory devices determine whether one of the digital values corresponding to an input voltage preceding the input voltage by an arbitrary number of cycles is greater than a predetermined value or not, so that the relay can protect against a near-end internal fault.

The method according to the invention is characterized in that it includes the aforementioned determining steps in apparatus of the type described above.

BRIEF DESCRIPTION OF THE DRAWINGS

In the accompanying drawings:

FIG. 1 shows a characteristic of an ordinary mho type relay;

FIG. 2 is a distance-current characteristic of the ordinary mho type relay;

FIG. 3 is a block diagram of a digital protective relay which includes the improvements according to the present invention;

FIG. 4 is a flow-chart showing the operation of the digital protective relay shown in FIG. 3;

DESCRIPTION OF THE PREFERRED EMBODIMENTS

Figure 5:
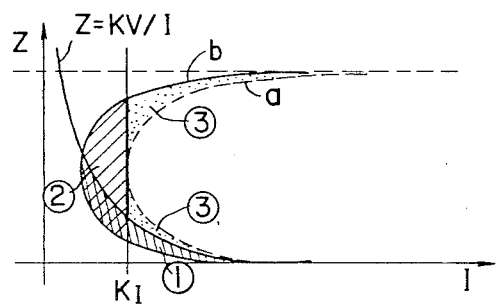
FIG. 5 is a distance-current characteristic of the digital protective relay which includes the improvements according to this invention.

An embodiment of a digital distance relay which includes the improvements according to the present invention will now be described with reference to FIG. 3.

In the digital distance relay shown in FIG. 3, the voltage and current of an electric power transmission system are detected by a potential transformer 1 and a current transformer 2, and are respectively converted by input converters 3 and 4 into appropriate values for the relaying operation. The analog outputs of the input converters 3 and 4 are further converted into digital values by A/D converters 5 and 6 each including a sample-hold circuit (not shown). The digital values obtained from the A/D converters 5 and 6 are applied through a direct memory access device 7 to a memory device 8 so that the digital values are memorized therein.

Based on the data thus memorized in the memory device 8, and under the control of the programs memorized in a read-only memory (ROM) 10, a central processing unit (CPU) 9 executes a relaying operation and also an operation according to the present invention which will be described hereinafter with reference to FIG. 4. When the relaying operation indicates that a fault occurs on the transmission line, a tripping instruction is issued to a circuit breaker (not shown) through an input-output interface 11 for interrupting the transmission line. The central processing unit 9 and the related parts may be Model 6701 made by MMI, Model 2901 made by AMA, or Model 8080 made by Intel Co.

In FIG. 4, there is indicated an example of a flow chart for explaining the operation of a distance relay embodying the present invention.

In the first step of the flow chart, a digital value corresponding to the input current I is compared with a predetermined value $K_I$, and only when the current is greater than the predetermined value $K_I$, the program is advanced to the next step. In the second step, a digital value corresponding to the input voltage V is compared with another predetermined value $K_V$. If the input voltage is equal to or less than the predetermined value $K_V$, the central processing unit does not initiate a relaying operation. However, if the digital value corresponding to the input voltage V is greater than the predetermined value $K_V$, a relaying operation is initiated which is carried out in the third step. In the above described operation, the predetermined values $K_I$ and $K_V$ are so selected that the third step is initiated only when the input current and the input voltage are both sufficiently high ($I > K_I$, $V > K_V$), and the adverse effects caused by noise and the like can be thereby excluded.

Although in the above described operation, the digital value corresponding to the input current is firstly compared with the predetermined value $K_I$, and then the digital value corresponding to the input voltage is compared with the predetermined value $K_V$, it will be apparent that the order of the two comparisons may be reversed, or in some specific cases, only a digital value corresponding to the input current or input voltage may be compared with a corresponding predetermined value.

Since the distance relay is operated as described above, a small value can be selected for the constant $K_o$ in the expression (1), and the relay is made operable along a characteristic curve b indicated by a solid line in FIG. 5.

When there is a possibility of causing erroneous operation in a region ② where the input current is equal to or less than the predetermined value $K_I$ or in a region ① wherein the input voltage is equal to or less than the predetermined value $K_V$ (that is $Z \leq K_V/I$), it has been a conventional practice to select the constant $K_o$ to be a larger value which manifests a characteristic curve a shown by broken line in FIG. 5.

According to the present invention, the relaying operation is initiated only when the input current is greater than a predetermined value $K_I$, or the input voltage is greater than a predetermined value $K_V$, and therefore any erroneous operation of the distance relay can be avoided regardless of the selection of a small value for the constant $K_o$ in the expression (1), wherein the operation of the distance relay follows the characteristic curve b shown by the solid line in FIG. 5.

More specifically, any erroneous operation of the relay can be avoided in the region ② defined by the solid line b and a line representing the predetermined value $K_I$ and in the region ① defined by the solid line b and a line representing the relation $Z = K_V/I$, regardless of the fact that a small value is selected for the constant $K_o$, and the sensitivity of the distance relay can be improved by an amount corresponding to a region ③ marked with dots in FIG. 5.

Where a directional judgment must be exercised while maintaining the mho-type relaying operation as shown in FIG. 1, a memorizing function is further required for the protection against a near-end internal fault (a fault which occurs at one end of the transmission line near the protective relay). The operation of the distance relay in such a case can be expressed by the following relation wherein a memorized voltage V' is employed in the expression (1).

$$K_Z V'I \cos(\theta - \phi) - V \cdot V' - K_o > 0 \qquad (3)$$

When the operation is accomplished by a digital relay, the memorized voltage V' can be easily obtained from the memory device by simply utilizing data preceding the instant voltage by n cycles.

Figure 6:
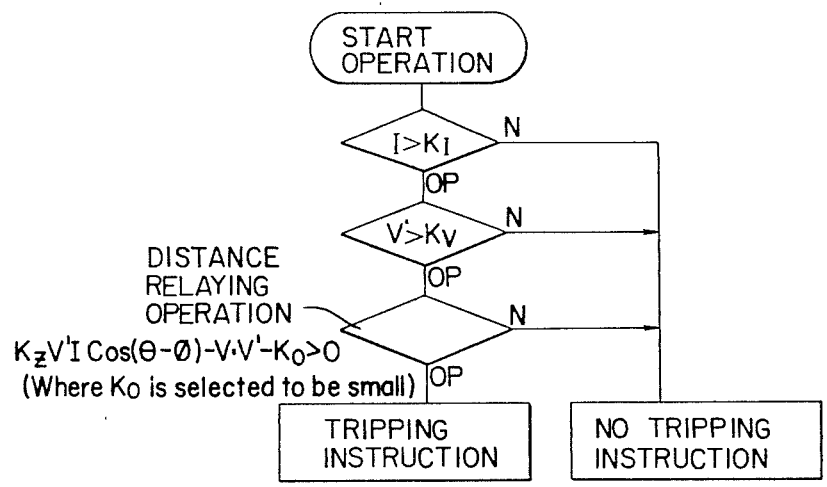
FIG. 6 is a flow-chart showing the operation of an embodiment of the present invention, wherein a memory function is added to the mho characteristics.
Figure 7:
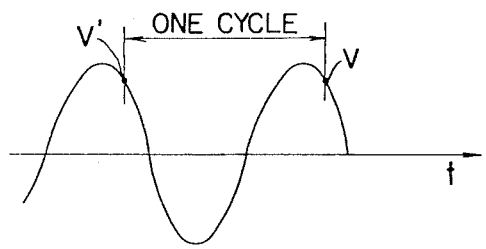
FIG. 7 is a waveform diagram showing an example of a memorized voltage in the modification.

For instance, when a near-end internal fault occurs thus losing the voltage at an end of a transmission line, the relaying operation can be continued for a period of n cycles by substituting the lost voltage by this memorized voltage, and by comparing the memorized voltage with the predetermined value $K_V$. A flow chart and a waveform of the memorized voltage (wherein it is assumed that n=1) are shown in FIGS. 6 and 7, respectively.

Although the invention has been described for the case of a mho-type protective relay, it will be apparent to those skilled in the art that the invention is also applicable to different types of distance relays.

Figure 8:
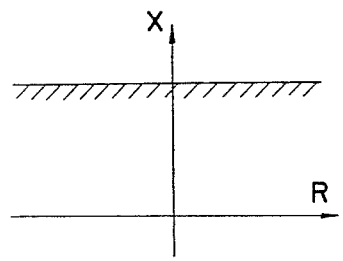
FIG. 8 shows a characteristic of an ordinary reactance relay.
Figure 9:
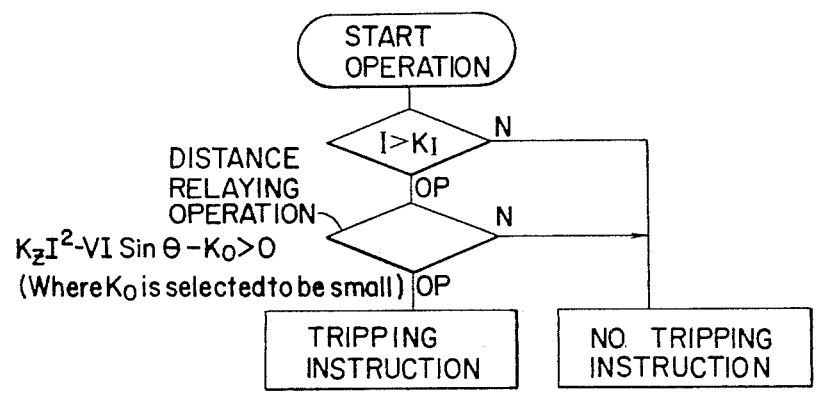
FIG. 9 is a flow-chart showing the operation of another embodiment wherein the principle of the present invention is applied to a reactance type protective relay.

In FIGS. 8–10, there is illustrated an embodiment wherein the invention is applied to a reactance type distance relay.

The reactance type operational characteristics can be expressed as follows.

$$K_Z I^2 - V I \sin \theta - K_o > 0 \quad (4)$$

wherein $K_Z$ is a set value, $K_o$ is a constant, and $\theta$ is an angle between the voltage V and the current I of a transmission line. When considering the distance detecting property of the relay for the case of the maximum sensitivity angle ($\theta = 90°$ and $\sin \theta = 1$), by substituting a relation $Z = V/I$ in the expression (4), the expression (4) can be simplified as $$I^2 > K_o/(K_Z - Z) \quad (5)$$

Figure 10A:
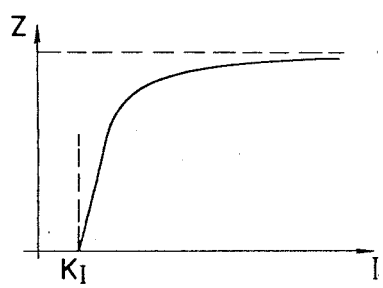
FIG. 10(a) is a distance-current characteristic of an ordinary reactance relay.

From this expression (5), it is apparent that the operational characteristic of an ordinary reactance type distance relay is as shown in FIG. 10(a).

Figure 10B:
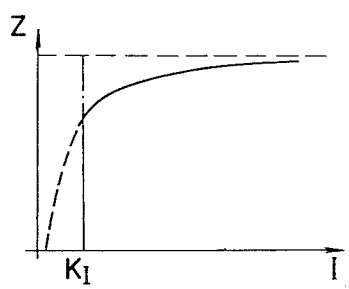
FIG. 10(b) is a distance-current characteristic of a reactance relay improved by the present invention.

To this type of distance relay, the present invention can be applied as shown in a flow chart of FIG. 9. In the first step of the flow chart, a current sensitivity of the distance relay is checked, and only when the input current $I > K_I$, the relaying operation is initiated which is carried out in the second step based on the data related to the input current and the input voltage. As a result, the aforementioned possibility of erroneous operation can be substantially eliminated regardless of the selection of a sufficiently small value for the constant $K_o$, and the distance detecting property as well as the sensitivity of the distance relay can be substantially improved as shown in FIG. 10(b) wherein the characteristic curve is entirely shifted leftwardly.

We claim:

1. In a digital distance relay for protecting an electric power line system comprising sample-hold circuits for sampling input voltage and current picked up from the power line system and holding the thus sampled values, analog-digital converters for converting the outputs of the sample-hold circuits into digital values corresponding to the input voltage and current, respectively, a first memory device memorizing said digital values, a second memory device memorizing a predetermined program, and a central processing unit for carrying out a relaying operation based on the digital values memorized in the first memory device under the control of the program memorized in the second memory device, the improvement comprising the central processing unit in cooperation with said memory devices determining whether a one of said digital values corresponding to one of said input current and said input voltage is greater than a predetermined value or not, and initiating said relaying operation when said one digital value is determined to be greater than said predetermined value.

2. The improvement as set forth in claim 1 wherein said central processing unit in cooperation with said memory devices further determines whether another of said digital values corresponding to the other of said input current and said input voltage is greater than a predetermined value or not and initiates said distance relaying operation when said digital values corresponding to said input current and said input voltage are greater than said respective predetermined values.

3. The improvement as set forth in claim 1 wherein said central processing unit in cooperation with said memory devices further determines whether a said digital value corresponding to an input voltage preceding said input voltage by an arbitrary number of cycles is greater than a predetermined value or not so that the relay can protect a near end internal fault.

4. In a method for controlling a digital distance relay for protecting an electric power line system comprising the steps of sampling input voltage and current from the power line system and holding the thus sampled values, converting the analog values sampled and held into digital values, memorizing said digital values, feeding said memorized digital values to a central processing unit and carrying out a relaying operation in the central processing unit under the control of a program, the improvement comprising the steps of determining in the central processing unit in cooperation with said memorized digital values and said program whether a one of said digital values corresponding to one of said input current and said input voltage is greater than a predetermined value or not, and the central processing unit initiating said relaying operation when said one digital value is determined to be greater than said predetermined value.

5. The improvement as set forth in claim 4 and further comprising the step of determining in said central processing unit in cooperation with said memorized digital values and said program whether another of said digital values corresponding to the other of said input current and said input voltage is greater than a predetermined value or not and the central processing unit initiating said relaying operation when said digital values corresponding to said input current and said input voltage are greater than said respective predetermining values.

6. The improvement as set forth in claim 4 and further comprising the step of determining in said central processing unit in cooperation with said memorized digital values and said program whether a said digital value corresponding to an input voltage preceding said input voltage by an arbitrary number of cycles is greater than a predetermined value or not so that the method can detect a near end internal fault.

* * * * *

UNITED STATES PATENT AND TRADEMARK OFFICE
CERTIFICATE OF CORRECTION

PATENT NO. : 4,357,666

DATED : November 2, 1982

INVENTOR(S) : Tetsuo Matsushima et al

It is certified that error appears in the above-identified patent and that said Letters Patent is hereby corrected as shown below:

Column 1, line 5, after "improvements" insert -- in --

Column 1, line 8, "improvement" should read -- improvements --.

Column 1, line 60 "preferably" should read ---preferable --.

Column 2, line 12, "improvement" should read -- improvements -- and insert -- in --.

Signed and Sealed this

Twelfth Day of April 1983

[SEAL]

Attest:

Attesting Officer

GERALD J. MOSSINGHOFF

Commissioner of Patents and Trademarks